United States Patent [19]
Sorensen et al.

[11] Patent Number: 5,389,330
[45] Date of Patent: Feb. 14, 1995

[54] INJECTION MOLDING OF CABLE TIES

[76] Inventors: Soren C. Sorensen, 12630 Carmel Country Rd., No. 110, San Diego, Calif. 92130; Jens O. Sorensen, P.O. Box 2274, Rancho Santa Fe, Calif. 92067

[21] Appl. No.: 10,538

[22] Filed: Jan. 28, 1993

[51] Int. Cl.⁶ ............................................. B65D 63/00
[52] U.S. Cl. .............................. 264/328.1; 24/17 AP; 24/16 PB; 264/334
[58] Field of Search ................ 264/328.9, 328.16, 334, 264/336, 328.8; 24/16 R, 16 PB, 17 AP

[56] References Cited

U.S. PATENT DOCUMENTS

| | | | |
|---|---|---|---|
| Re. 31,541 | 3/1984 | Wood | 24/16 PB |
| 3,102,311 | 9/1963 | Martin et al. | 24/16 PB |
| 3,523,991 | 8/1970 | Tucker | 264/328.9 |
| 3,660,869 | 5/1972 | Caveney et al. | 24/16 PB |
| 3,717,906 | 2/1973 | Wells | 24/16 PB |
| 3,908,233 | 9/1975 | Caveney et al. | 24/16 PB |
| 3,924,299 | 12/1975 | McCormick | 24/16 PB |
| 3,965,538 | 6/1976 | Caveney et al. | 24/16 PB |
| 3,973,292 | 8/1976 | Bonnet | 24/16 PB |
| 4,214,349 | 7/1980 | Munch | 24/16 PB |
| 4,362,687 | 12/1982 | Olschewski et al. | 264/334 |
| 4,383,670 | 5/1983 | Olschewski et al. | 264/334 |
| 4,473,524 | 9/1984 | Paradis | 264/291 |
| 4,532,679 | 8/1985 | Scott | 24/16 PB |
| 4,754,529 | 7/1988 | Paradis | 24/16 PB |
| 4,956,142 | 9/1990 | Mangone, Jr. | 264/328.9 |
| 5,146,654 | 9/1992 | Caveney et al. | 24/16 PB |

*Primary Examiner*—Mathieu D. Vargot
*Attorney, Agent, or Firm*—Edward W. Callan

[57] ABSTRACT

A cable tie having a tongue with ratchet teeth on opposite broad sides of the tongue and two stationary teeth on an abutment surface opposite a hinged pawl within a locking head opening is injection molded by combining a first mold part defining a portion of a mold cavity that forms a first set of ratchet teeth on the one broad side of the tongue and a second mold part that defines a portion of the mold cavity that forms a second set of ratchet teeth on the other broad side of the tongue. The second mold part includes a core that defines at least a portion of the mold cavity that forms the opening in the locking head; and the first mold part is combined with the core of the second mold part at an interior parting surface that is remote from the portion of the mold cavity that forms the apexes of the stationary teeth. The solidified tie is ejected from the opened mold without separating the mold parts at any portion of the mold cavity that forms an apex of the stationary teeth.

2 Claims, 1 Drawing Sheet

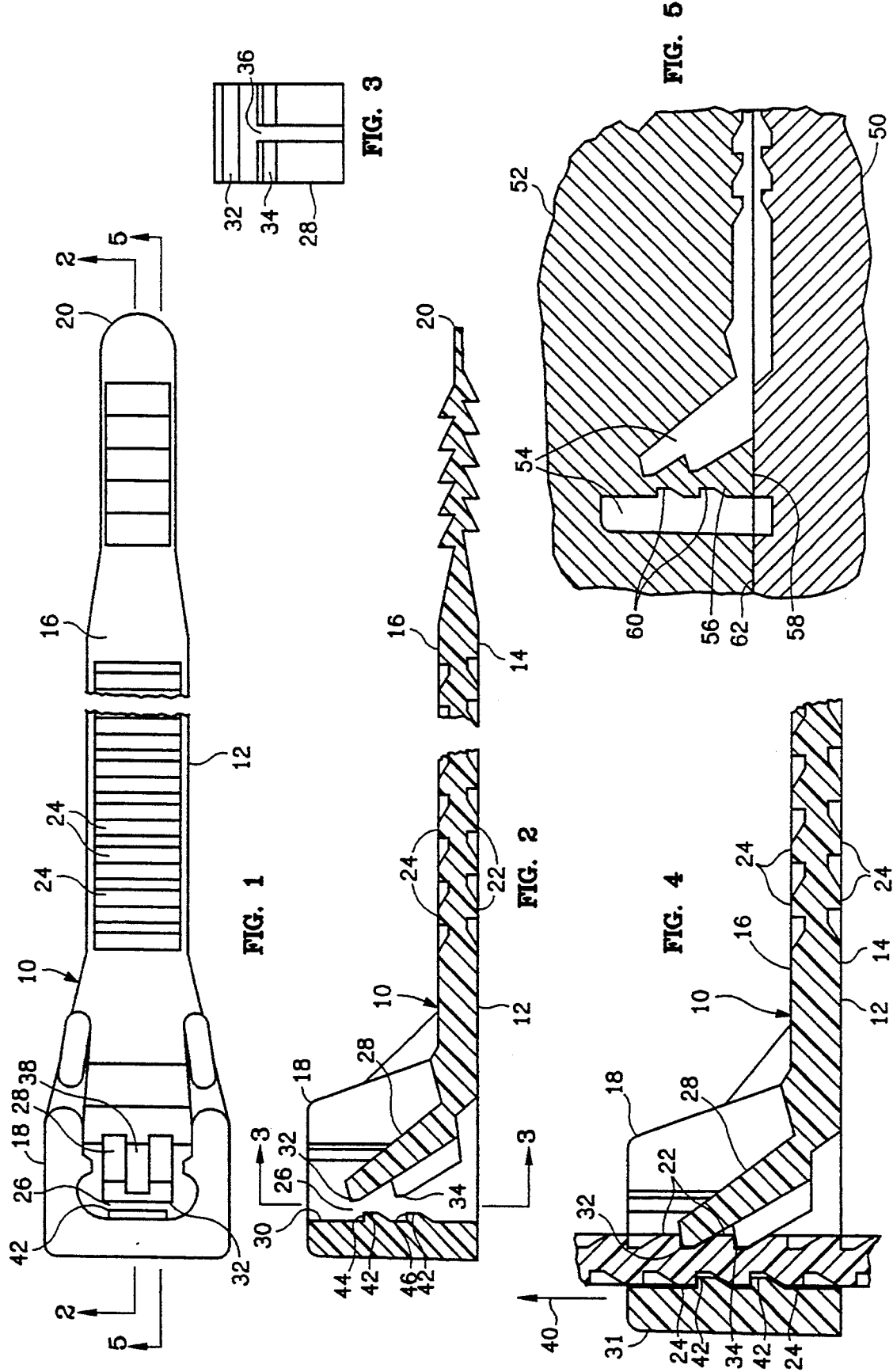

INJECTION MOLDING OF CABLE TIES

BACKGROUND OF THE INVENTION

The present invention generally pertains to injection molding a tie that is useful for forming a loop for retaining a bundle of elongated articles, such as cables, and is particularly directed to injection molding a particular design of such a tie. According to such particular design, the tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue; wherein the locking head has sides defining an opening for receiving the tip of the tongue to form said loop, including a movable pawl that is hinged at one side of said opening and with an abutment surface on the opposite side of said opening from the pawl; wherein the pawl has at least one pawl tooth disposed for engaging the first set of ratchet teeth when the tip of the tongue has been inserted through said opening with the second set of ratchet teeth facing the abutment surface, wherein the pawl, when the at least one pawl tooth is so engaged, is movable toward the abutment surface in response to pressure applied to the tongue in a direction opposite to the direction of said insertion in order to force the second set of ratchet teeth against the abutment surface; and at least one stationary tooth disposed on the abutment surface and having an apex for engaging the second set of ratchet teeth when the second set of ratchet teeth is forced against the abutment surface to thereby in combination with the at least one pawl tooth hold the tongue in the locking head when pressure is applied to the tongue in the direction opposite to the direction of said insertion. This particular design of tie is preferred because the combined engagement of ratchet teeth on both sides of the tongue enhances the retaining function of the tie. Such a tie is described in U.S. Pat. Nos. 4,473,524 to Paradis and 5,146,654 to Caveney et al.

Heretofore, it has not been considered practical to injection mold such a tie because it has been thought that such a tie could not be ejected from a mold following solidification of the tie without damage to the at least one stationary tooth unless the mold parts were separated at the portion of the mold cavity defining the apex of the at least one stationary tooth.

SUMMARY OF THE INVENTION

The present invention provides a tie as described above, wherein the tie is injection molded by a method comprising the steps of (a) providing a mold by combining mold parts to define a mold cavity for forming the tie; (b) injecting molding material into the mold cavity to form the tie; (c) solidifying the injected molding material to solidify the tie: (d) separating the mold parts to open the mold: and (e) ejecting the solidified tie from the opened mold; wherein step (a) comprises providing a first mold part defining a portion of the mold cavity that forms the first set of ratchet teeth on the one broad side of the tongue and a second mold part that defines a portion of the mold cavity that forms the second set of ratchet teeth on the other broad side of the tongue, wherein the second mold part includes a core that defines at least a portion of the mold cavity that forms the opening in the locking head, and wherein the first mold part is combined with the core of the second mold part at an interior parting surface that is remote from the portion of the mold cavity that forms the apex of the at least one stationary tooth; and wherein steps (d) and (e) comprise ejecting the solidified tie from the opened mold without separating the mold parts at the portion of the mold cavity that forms the at least one stationary tooth apex and wherein the tie bears a line defined by said interior parting surface and does not bear a line defined by a parting surface of mold parts adjoining the at least one stationary tooth apex. A surface at which mold parts are separated for enabling removal of an injection molded product from the mold is a parting surface of mold parts.

It has been discovered that a tie can be injection molded in accordance with said method of the present invention without damaging the at least one stationary tooth when the tie is ejected from the mold following solidification of the tie.

In accordance with this discovery the present invention further provides an injection molded tie as described above having at least two stationary teeth disposed on the abutment surface and respectively having apexes for engaging different teeth of the second set of ratchet teeth in a portion of the tongue engaged by the at least one pawl tooth when the second set of ratchet teeth is forced against the abutment surface to thereby In combination with the at least one pawl tooth hold the tongue In the locking head when pressure is applied to the tongue In the direction opposite to the direction of said insertion. The additional stationary teeth further enhance the retaining function of the tie.

Additional features of the present invention are described in relation to the detailed description of the preferred embodiment.

BRIEF DESCRIPTION OF THE DRAWING

FIG. 1 is a top plan view of a tie that is injection molded in accordance with the present invention.

FIG. 2 is a sectional view of the tie of FIG. 1 taken along lines 2—2 in FIG. 1.

FIG. 3 is plan view of the pawl of the tie of FIG. 1 taken along lines 3—3 in FIG. 2.

FIG. 4 Is a partial sectional view Illustrating the ratchet teeth on opposite sides of the tongue of the tie of FIG. 1 being engaged by the pawl teeth and the stationary teeth within the locking head.

FIG. 5 is a partial sectional view of a portion of the mold that defines a portion of the mold cavity that forms the corresponding portion of the tie as taken along lines 5—5 in FIG. 1.

DETAILED DESCRIPTION

Referring to the Drawing, a preferred embodiment of an injection molded tie 10 according to the present invention includes an elongated tongue 12, having two opposing broad sides 14, 16, a locking head 18 at one end of the tongue 12 and a tip 20 at the other end of the tongue 12. A first set of ratchet teeth 22 extends along one broad side 14 of the tongue 12 and a second set of ratchet teeth 24 extends along the other broad side 16 of the tongue 12. The first set of ratchet teeth 22 may be aligned with the second set of ratchet teeth 24 (not shown) or displaced from the second set of ratchet teeth 24, as shown in the Drawing. The distance by which the first set of ratchet teeth 22 is displaced from the second set of ratchet teeth 24 can be any percentage of the distance between adjacent ratchet teeth.

The locking head 18 has sides defining an opening 26 for receiving the tip 20 of the tongue 12 and thereby form a closed loop around a bundle of articles (not shown). The locking head 18 includes a movable pawl 28 that is hinged at one side of the opening 26 and has an abutment surface 30 on the opposite side of the opening 26 from the pawl 28. The abutment surface 30 is almost parallel to the surface 31 on the opposite side of the locking head wall containing the abutment surface 30.

The pawl 28 has two pawl teeth 32, 34 disposed for engaging the first set of ratchet teeth 22 when the tip 20 of the tongue 12 has been inserted through the opening 26 with the second set of ratchet teeth 24 facing the abutment surface 30. In other embodiments, the pawl 28 may have one or more than two pawl teeth.

One of the pawl teeth 34 includes a hollow section 36; and the opposite side of the pawl 28 includes a hollow section 38. These hollow sections 36, 38 are designed to prevent deformation of the pawl teeth 32, 34 during injection molding, as more fully described in applicants' copending U.S. patent application Ser. Nos. 07/747,732 and 07/836,496. Such hollow sections 36, 38 are not required in all embodiments.

When the pawl teeth 32, 34 are engaged with the first set of ratchet teeth 22, the pawl 28 is movable toward the abutment surface 30 in response to pressure applied to the tongue 12 in a direction opposite to the direction of insertion 40 (FIG. 4) in order to force the second set of ratchet teeth 24 against the abutment surface 30.

There are two stationary teeth 42 disposed on the abutment surface 30. Each stationary tooth 42 has a flat surface 44 terminating in an apex 46 for engaging the second set of ratchet teeth 24 in a portion of the tongue 12 engaged by the pawl teeth 32, 34 when the second set of ratchet teeth 24 is forced against the abutment surface 30 to thereby in combination with the two pawl teeth 32, 34 hold the tongue 12 in the locking head 18 when pressure is applied to the tongue 12 in the direction opposite to the direction of insertion 40. In other embodiments, there may be one or more than two stationary teeth 42 disposed on the abutment surface 30.

The positions of the pawl 28 and the abutment surface 30 can be interchanged to be on opposite sides of the opening 26 from the respective positions shown in the Drawing so that the abutment surface is on the side of the locking head 18 adjacent the tongue 12.

The tie 10 is injection molded by a method including the steps of (a) providing a mold by combining mold parts 50, 52 (FIG. 5) to define a mold cavity 54 for forming the tie 10;

(b) injecting molding material into the mold cavity 54 to form the tie 10;

(c) solidifying the injected molding material to solidify the tie 10;

(d) separating the mold parts 50, 52 to open the mold; and (e) ejecting the solidified tie 10 from the opened mold.

Step (a) includes providing a first mold part 50 defining a portion of the mold cavity 54 that forms the first set of ratchet teeth 22 on the one broad side 14 of the tongue 12 and a second mold part 52 opposing the first mold part 50 that defines a portion of the mold cavity 54 that forms the second set of ratchet teeth 24 on the other broad side 16 of the tongue 12. The second mold part 52 includes a core 56 that defines at least a portion of the mold cavity 54 that forms the opening 26 in the locking head 18. The first mold part 50 is combined with the core 56 of the second mold part 52 at an interior parting surface 58 that is remote from the portions 60 of the mold cavity 54 that form the apexes 46 of the two stationary teeth 42. An exterior parting surface 62 circumscribes the mold cavity 54 and is approximately coplanar with the interior parting surface 58. In other embodiments, an exterior parting surface circumscribing the mold cavity 54 need not be coplanar with the interior parting surface 58. A parting surface is a surface which when the mold is closed contacts the opposing mold part and which when the mold is opened is separated from the opposing mold part.

Steps (d) and (e) include ejecting the solidified tie 10 from the opened mold without separating the mold parts 50, 52 at any portion of the mold cavity that forms either of the two stationary teeth apexes 46.

The tie 10 is molded from Nylon 6.6 molding material with steel mold parts 50, 52 that are cooled to within a temperature range of approximately 10 to 20 degrees Centigrade. The method is operable at other temperatures.

When the mold is opened, the tie 10 is ejected by an ejector (not shown) at an ejection speed of 200 millimeters per second. The method is operable at other ejection speeds.

The method of the present invention can be used to simultaneously injection mold a plurality of ties 10 with a mold defining a plurality of mold cavities 54 for forming the plurality of ties.

We claim:

1. An injection molded tie that is useful for forming a loop for retaining a bundle of elongated articles, the tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue;

wherein the locking head has sides defining an opening for receiving the tip of the tongue to form said loop, including a movable pawl that is hinged at one side of said opening and with an abutment surface on the opposite side of said opening from the pawl;

wherein the pawl has at least one pawl tooth disposed for engaging the first set of ratchet teeth when the tip of the tongue is inserted through said opening with the second set of ratchet teeth facing the abutment surface, wherein the pawl, when the at least one pawl tooth is so engaged, is movable toward the abutment surface in response to pressure applied to the tongue in a direction opposite to the direction of said insertion in order to force the second set of ratchet teeth against the abutment surface; and at least one stationary tooth disposed on the abutment surface and having an apex for engaging the second set of ratchet teeth when the second set of ratchet teeth is forced against the abutment surface to thereby in combination with the at least one pawl tooth hold the tongue in the locking head when pressure is applied to the tongue in the direction opposite to the direction of said insertion.

wherein the tie is injection molded by a method comprising the steps of (a) providing a mold by combining mold parts to define a mold cavity for forming the tie;

(b) injecting molding material in the mold cavity to form the tie;

(c) solidifying the injected molding material to solidify the tie;

(d) separating the mold parts to open the mold; and (e) ejecting the solidified tie from the opened mold;

wherein step (a) comprises providing a first mold part defining a portion of the mold cavity that forms the first set of ratchet teeth on the one broad side of the tongue and a second mold part that defines a portion of the mold cavity that forms the second set of ratchet teeth on the other broad side of the tongue wherein the second mold part includes a core that defines at least a portion of the mold cavity that forms the opening of the locking head, and wherein the first mold part is combined with the core of the second mold part at an interior parting surface that is not adjoining the portion of the mold cavity that forms the apex of the at least one stationary tooth; and wherein steps (d) and (e) comprise ejecting the solidified tie from the opened mold without separating the mold parts at the portion of the mold cavity that forms the at least one stationary tooth apex; and wherein the tie bears a line defined by said interior parting surface and does not bear a line defined by a parting surface of mold parts adjoining the at least one stationary tooth apex.

2. An injection molded tie that is useful for forming a loop for retaining a bundle of elongated articles, the tie comprising an elongated torque with two ends and two broad sides, a locking head at one end of the tongue, a tip at the other end of the tongue, a first set of ratchet teeth extending along one broad side of the tongue and a second set of ratchet teeth extending along the other broad side of the tongue;

wherein the locking head has sides defining an opening for receiving the tip of the tongue to form said loop, including a movable pawl that is hinged at one side of said opening and with an abutment surface on the opposite side of said opening from the pawl;

wherein the pawl has at least one pawl tooth disposed for engaging the first set of ratchet teeth when the tip of the tongue is inserted through said opening with the second set of ratchet teeth facing the abutment surface, wherein the pawl, when the at least one pawl tooth is so engaged, is movable toward the abutment surface in response to pressure applied to the tongue in a direction opposite to the direction of said insertion in order to force the second set of ratchet teeth against the abutment surface; and at least two stationary teeth disposed on the abutment surface and respectively having apexes for engaging different teeth of the second set of ratchet teeth in a portion of the tongue engaged by the at least one pawl tooth when the second set of ratchet teeth is forced against the abutment surface to thereby in combination with the at least one pawl tooth hold the tongue in the locking head when pressure is applied to the tongue in the direction opposite to the direction of said insertion;

wherein the tie is injection molded by a method comprising the steps of (a) providing a mold by combining mold parts to define a mold cavity for forming the tie;

(b) injecting molding material in the mold cavity to form the tie;

(c) solidifying the injected molding material to solidify the tie;

(d) separating the mold parts to open the mold; and (e) ejecting the solidified tie from the opened mold;

wherein step (a) comprises providing a first mold part defining a portion of the mold cavity that forms the first set of ratchet teeth on the one broad side of the tongue and a second mold part that defines a portion of the mold cavity that forms the second set of ratchet teeth on the other broad side of the tongue, wherein the second mold part includes a core that defines at least a portion of the mold cavity that forms the opening of the locking head, and wherein the first mold part is combined with the core of the second mold part at an interior parting surface that is not adjoining a portion of the mold cavity that forms the apex of at least one of the at least two stationary teeth; and wherein steps (d) and (e) comprise ejecting the solidified tie from the opened mold without separating the mold parts at at least one portion of the mold cavity that forms the apex of one of the at least two stationary teeth; and wherein the tie bears a line defined by said interior parting surface and does not bear a line defined by a parting surface of mold parts adjoining the apex of at least one of the at least two stationary teeth.

* * * * *

UNITED STATES PATENT AND TRADEMARK OFFICE
CERTIFICATE OF CORRECTION

PATENT NO.   : 5,389,330
DATED        : February 14, 1995
INVENTOR(S)  : SORENSEN ET AL.

It is certified that error appears in the above-indentified patent and that said Letters Patent is hereby corrected as shown below:

Column 2, line 1, change "remote from" to --not adjoining--.

Column 2, line 15, delete "of the present".

Column 2, line 16, delete "invention".

Column 2, line 27, change "In" to --in--.

Column 2, line 28, change "In" to --in--.

Column 2, line 29, change "In" to --in--.

Column 2, line 43, change "Is" to --is--; and change "Illustrating" to --illustrating--.

Column 3, line 3, change "dosed" to --closed--.

Column 5, line 35 change "torque" to --tongue--.

Signed and Sealed this

Thirteenth Day of June, 1995

Attest:

BRUCE LEHMAN

*Attesting Officer*          *Commissioner of Patents and Trademarks*